Figure 1A:
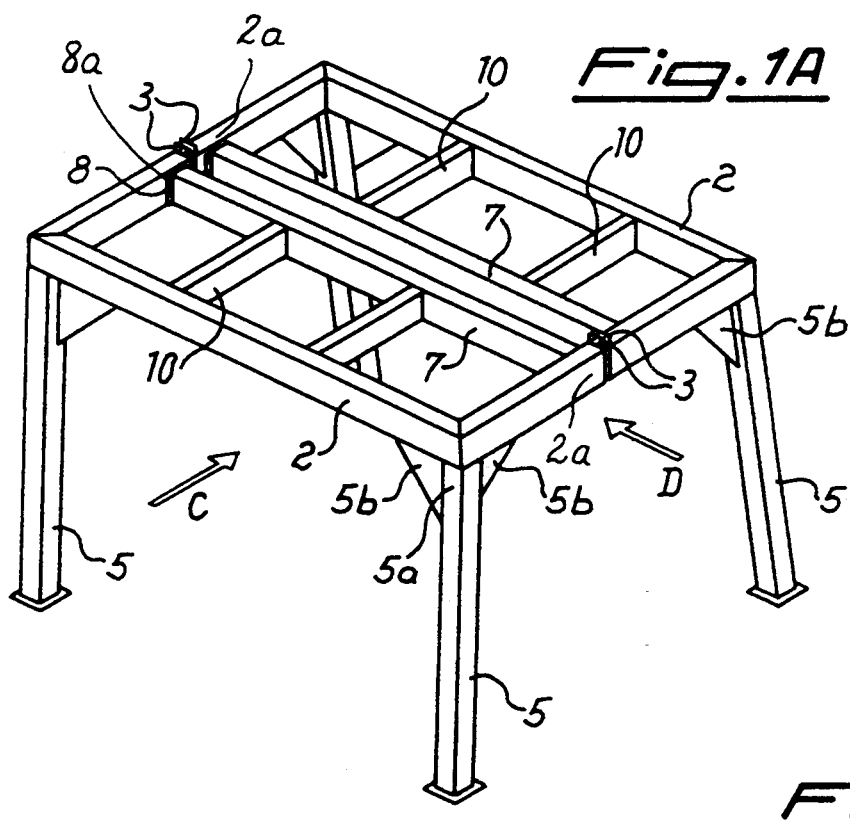
Figure 1D:
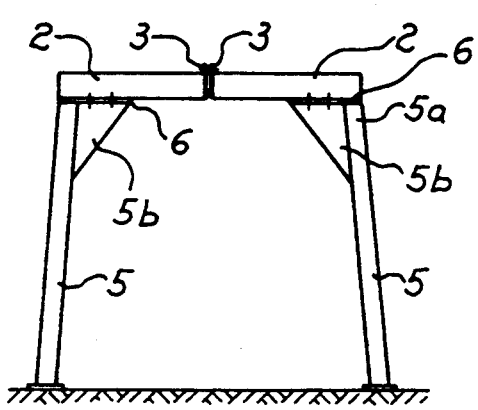
Figure 1B:
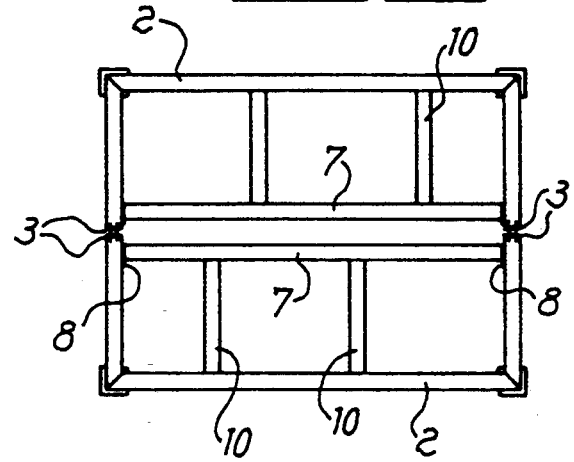
Figure 1C:
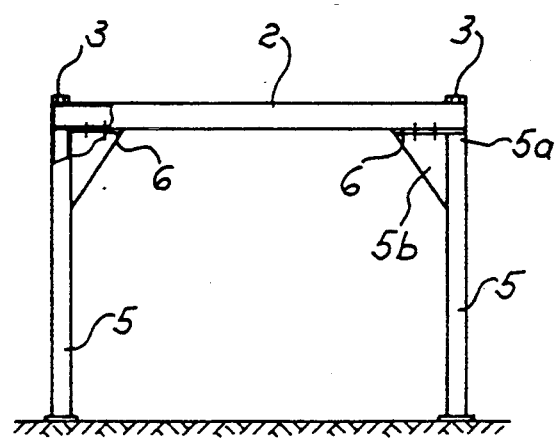
Figure 3A:
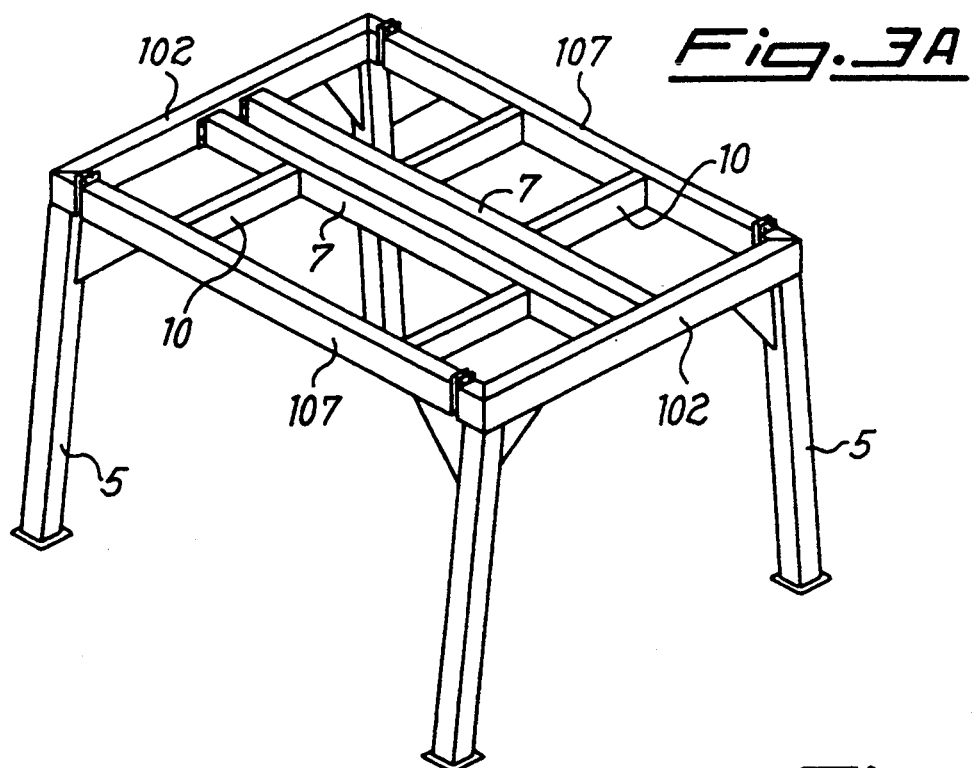
Figure 3D:
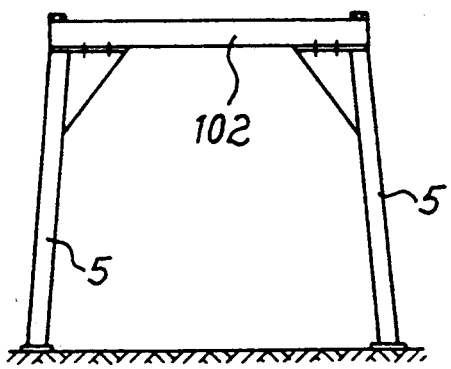
Figure 3B:
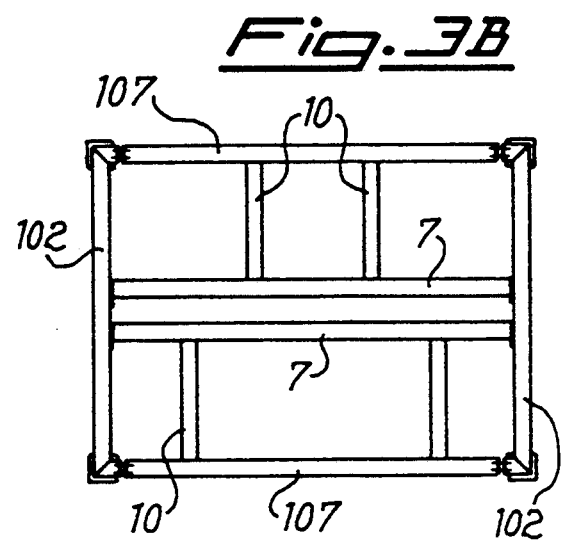
Figure 3C:
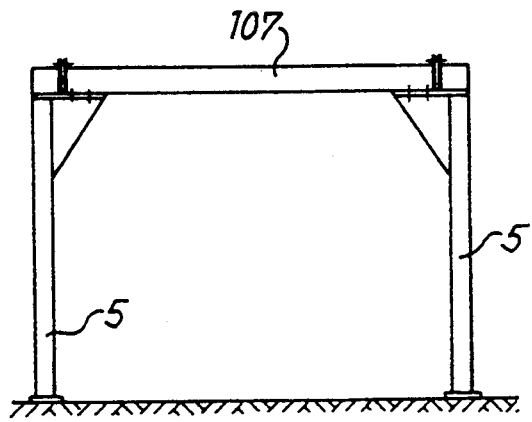

United States Patent [19]

Lietti

[11] Patent Number: 5,451,028

[45] Date of Patent: Sep. 19, 1995

[54] SUPPORTING FRAME FOR TEXTILE MACHINE OPERATING DEVICES WITH "C" SHAPED AND RECTILINEAR TUBULAR COMPONENTS

[75] Inventor: Alessandro Lietti, Bregnano, Italy

[73] Assignee: Lietti S.r.l., Bregnano, Italy

[21] Appl. No.: 184,880

[22] Filed: Jan. 21, 1994

[30] Foreign Application Priority Data

Apr. 13, 1993 [IT] Italy .................. MI9300290 U

[51] Int. Cl.⁶ .................................................. F16M 3/00
[52] U.S. Cl. ...................................... 248/676; 108/64
[58] Field of Search ............... 248/676, 678, 673, 670,
248/637, 150, 165; 108/64, 153

[56] References Cited

U.S. PATENT DOCUMENTS

| | | | |
|---|---|---|---|
| 3,875,712 | 4/1975 | Thompson | 108/153 X |
| 4,512,543 | 4/1985 | Petrick | 248/673 X |
| 4,660,799 | 4/1987 | Butland | 248/676 |
| 5,308,037 | 5/1994 | Gonzalez | 248/676 X |

*Primary Examiner*—Ramon O. Ramirez
*Attorney, Agent, or Firm*—Herbert Dubno

[57] ABSTRACT

A supporting frame (1) for textile machine operating devices comprising upright members (5) and horizontal members integral with such uprights, characterized in that such horizontal members are comprised of at least one pair of "C" shaped tubular components (2; 102) and at least one pair of rectilinear tubular components (7) to be connected lengthwise to the "C" components, there being provided means of assembly (3; 103) capable of being joined together by means of bolts (4).

10 Claims, 4 Drawing Sheets

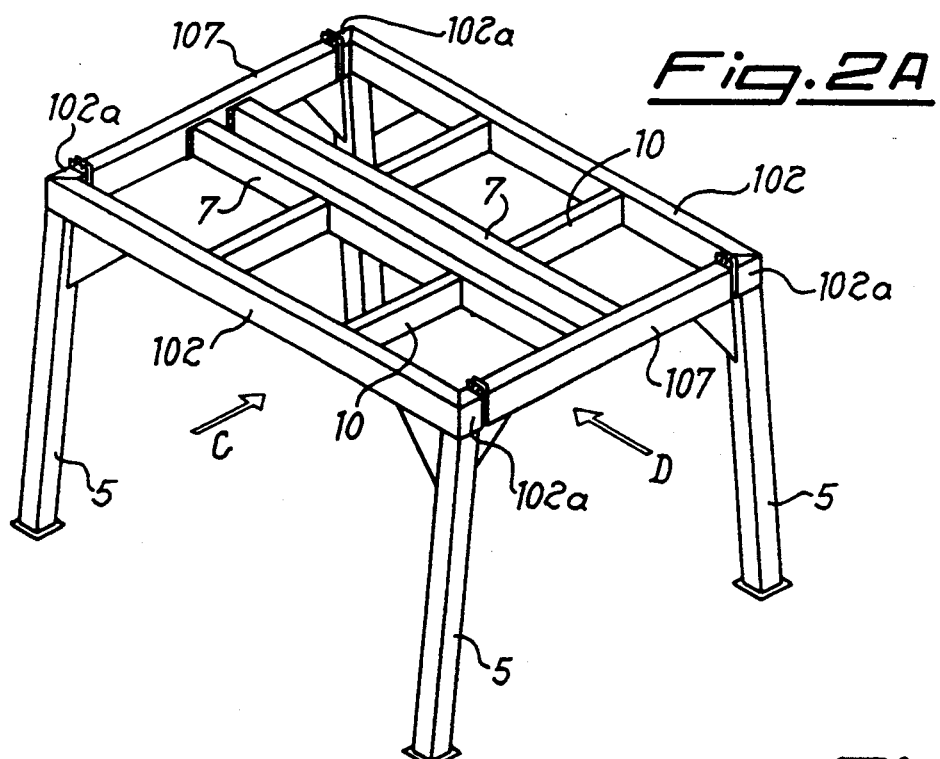
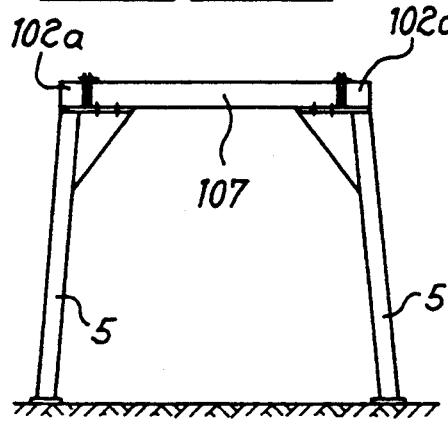
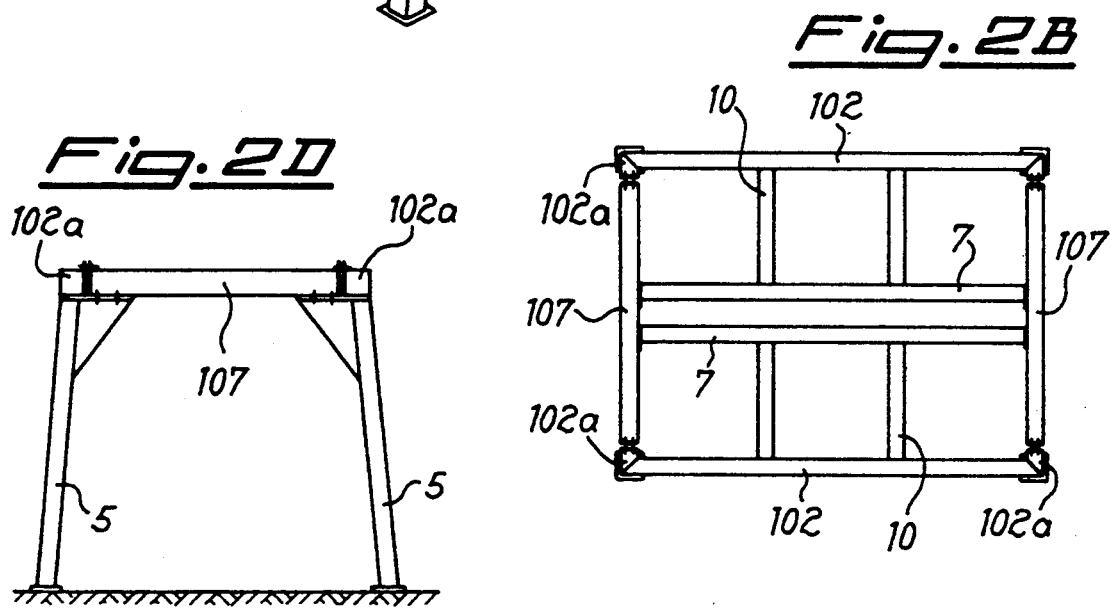
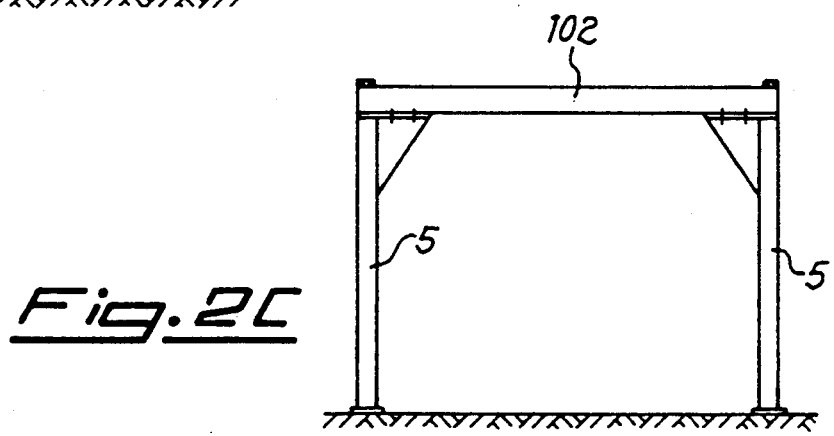

SUPPORTING FRAME FOR TEXTILE MACHINE OPERATING DEVICES WITH "C" SHAPED AND RECTILINEAR TUBULAR COMPONENTS

DESCRIPTION

The object of this invention is a supporting structure for loom operating devices on textile machines, consisting of at least one pair of C-shaped tubular components joined together by means of bolts. There is known in the technological field of textile machinery the need to use devices for operating the looms of textile machines in an overhead position relative to such machines because of the need to control by means of wires the operating hooks of the said machines. Such devices are usually known as "Jacquards", and to be able to obtain their movement in an overhead position use is made of frames consisting of beams of varying section supported by uprights of matching section. Such known type of frame poses, however, numerous disadvantages in that it is necessary to carry out welding at the time of installation on site with a consequent increase in the possibility of defects brought about by the difficulty of being able to operate under optimum conditions, particularly with regard to vertical welds which are the most critical.

Furthermore such usual beams require the application of stiffening members in order to ensure the necessary rigidity of the frame when subjected to high static and dynamic stressing.

Additionally, the beams used usually have open surfaces exposed to the accumulation of weaving dust which, as is known, builds up in a large quantity in the vicinity of every textile machine. Such accumulation and disposal of dust, which may also bring about mechanical failure of the machines, is particularly difficult to eliminate and it should moreover be borne in mind that normal cleaning operations necessitate shutting down the machines with consequent loss of productivity. There is therefore posed the technical problem of providing a supporting frame for textile machine operating devices which can be very easily fitted on site without the need for welding operations at the time of assembly, which possesses high rigidity so as to avoid the need for applying auxiliary stiffening members, and which does not have surfaces exposed to the accumulation of weaving dust which are difficult to reach for cleaning operations.

Within the scope of such problem, a further technical requirement is that the frame be comprised to the greatest possible extent of standardized and interchangeable components to ensure higher versatility in use and less need for storage of different parts. Such components should moreover be to the greatest possible extent easy to handle and of reduced unit dimensions in order to reduce the dimensions of the packing for shipment and to enable them to be implemented within confined spaces.

Such results are obtained by a supporting frame for textile machine operating devices comprising upright members and horizontal members integral with such uprights, in which such horizontal members are comprised of at least one pair of "C" shaped tubular components and at least one pair of rectilinear tubular components to be connected lengthwise to the "C" components, there being provided means of assembly capable of being joined together by means of bolts.

In a preferred form of implementation of the frame according to the invention, such "C" and rectilinear components are of substantially square cross-section and such "C" components have arms of reduced dimensions in relation to the length of the body of the "C", assembly being obtained in such case via a further pair of rectilinear components interposed between such arms for the achievement of the preset width of the said frame.

According to the invention, it is further provided that such "C" and rectilinear components have ends provided with flanges with predrilled holes for frontal assembly by means of bolts.

In a further form of implementation of the supporting frame for textile machine operating devices according to the invention, such frontal assembly is obtained by means of flanges placed in contact with at least one pair of opposing surfaces of the components to be made integral, and made integral therewith by means of bolts or by means of a connection component partly inserted into each component to be assembled and provided with holes for inserting the bolts.

Further details may be obtained from the following description with reference to the attached drawings, which show:

FIGS. 1A, 1B, 1C, 1D: A form of implementation of the frame according to the invention shown in perspective view, in plan view and according to arrows C and D of FIG. 1A;

FIGS. 2A, 2B, 2C, 2D: A further form of implementation of the frame of FIG. 1A shown in perspective view, in plan view and according to arrows C and D of FIG. 2A;

FIGS. 3A, 3B, 3C, 3D: The frame of FIG. 2A according to a different orientation shown in perspective view, in plan view and according to arrows C and D of FIG. 2A, and FIGS. 4A, 4B, 4C, 4D: Different forms of implementation of the connection between the components of the structure.

Figure 4A:
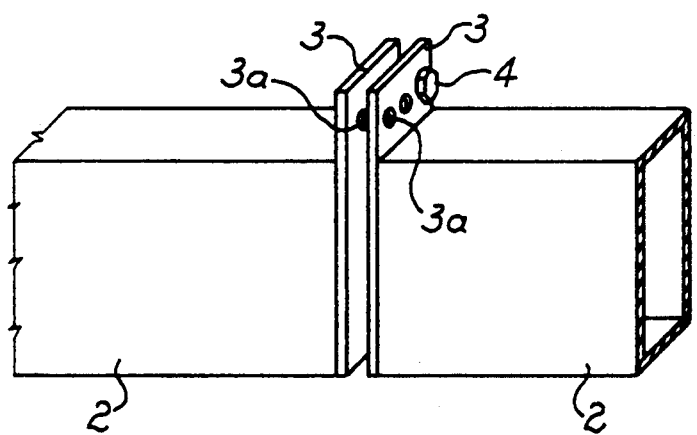

As shown in the figures, frame 1 is essentially comprised of a pair of "C" shaped tubular components 2 of substantially square or rectangular cross-section with ends 2a of the C ending in a flange 3 provided with holes 3a for the insertion of connecting bolts 4 (FIGS. 1A and 4A). Such "C" components 2 are made horizontally integral with uprights 5 of preset height, depending on the particular application, by means of further bolts 5 engaging flanges 6 located horizontally at each upper end 5a of uprights 5 and stiffened by means of gussets 5b likewise integral with the upper end of upright 5.

As shown in the figures, once the two "C" components are made integral with one another and with the uprights there is determined a rectangular area within which are located further rectilinear tubular components 7, the ends of which are likewise provided with connecting flanges 8 having holes 8a for the insertion of bolts 4.

The empty areas delimited by C components 2 and by rectilinear components 7 may then be used for the application of further rectilinear components 10 on which will be supported the operating device which is self-evident and therefore not illustrated.

It is therefore clear that while such area delimited by C components 2 and rectilinear components 7 may be regarded as standardizable, the location of transverse components 10 is strictly governed by the position and by the distances between centres of the members supporting such operating device.

As can be seen in FIGS. 2A, 2B, the pair of "C" tubular components 102 may be provided with arms 102a of reduced extent, provision being made in such case for the envisaged width of the frame to be achieved by means of linear components 107 interposed between arms 102a of such "C" component 102. This type of configuration, while necessitating a greater number of connections by means of bolts 4, makes it possible to use tubular components of smaller dimensions and therefore easier to handle, thus facilitating assembly even in confined spaces.

As illustrated in FIGS. 3A–3D, "C" tubular component 102 may be located crosswise rather than lengthwise, which may prove advantageous inasmuch as the assembly formed by the two adjacent uprights 5 connected to "C" 102 is balanced and can therefore be maintained erect without the need to use supporting accessories.

Figure 4B:
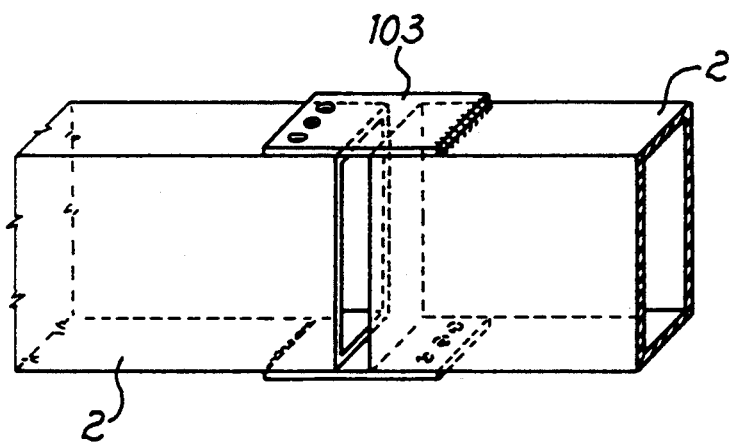
Figure 4C:
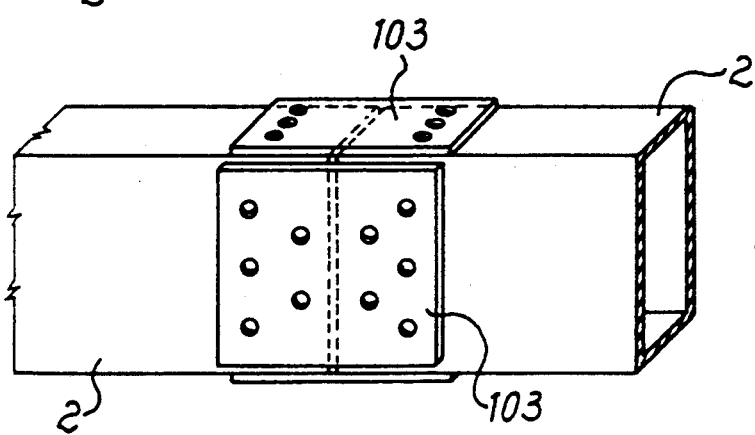
Figure 4D:
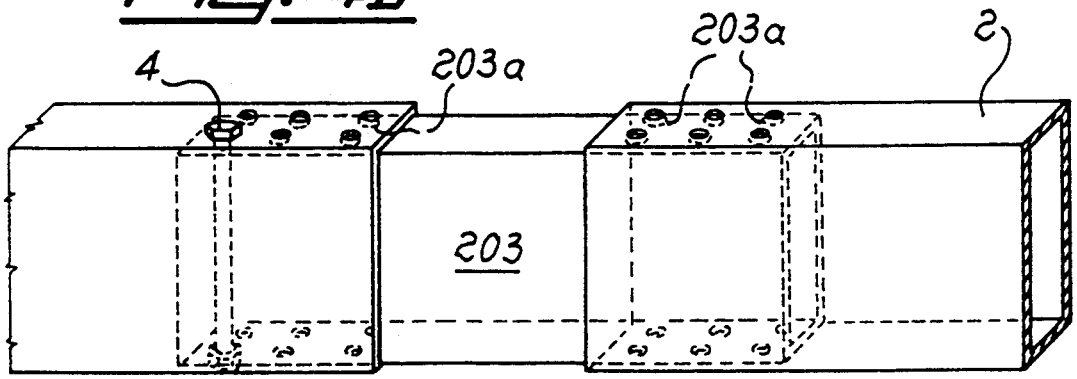

In order to avoid the need to carry out welding provision is made for certain alternative forms of connection by means of flange 3 which may be made integral with the ends of the arms of the "C" for frontal assembly (FIG. 4A), or separate from the tubular components as shown at 103 in FIGS. 4B and 4C.

Lastly, there may in some cases prove advantageous a connection made by means of a component 203 capable of being inserted in tubular components 2 in preset positions determined by holes 203a which should be located coaxially to allow the insertion of fixing bolts 4.

It is therefore clear from the foregoing description that the frame according to the invention provides high adaptability, lightness and rigidity as a result of the use of tubular components which, moreover, do not have inaccessible areas of accumulation of weaving dust, thus reducing the need for shutting down the machine in order to carry out unavoidable cleaning operations.

I claim:

1. A support frame for a textile machine, comprising:
    two mutually coplanar generally C-shaped frame components, each having arms extending toward the arms of the other C-shaped frame component and aligned therewith, the arms of each C-shaped frame component being connected by a respective bar, the arms and bar being tubular and of peripherally closed rectangular cross section;
    at least two mutually parallel rectilinear components having lengths substantially equal to a span between arms of said C-shaped frame components, in a common plane with said C-shaped components, and connected to said C-shaped frame components by bolting to define a horizontal rectangular frame capable of supporting a textile machine, said rectilinear components being tubular and of peripherally closed rectangular cross section; and
    uprights extending downwardly from corners of said C-shaped frame components to form legs for said horizontal rectangular frame, said uprights being tubular and of peripherally closed rectangular cross section.

2. The support frame defined in claim 1 wherein said aligned arms of said C-shaped frame components are joined together end-to-end in bolted junctions, and said rectilinear components span ends of said arms of said C-shaped frame components and are bolted thereto.

3. The support frame defined in claim 2 wherein said bolted junctions comprise flanges closing ends of said arms and bolts traversing said flanges.

4. The support frame defined in claim 2 wherein said bolted junctions comprise plates overlapping flanges ends of said arms and bolts traversing said flanges.

5. The support frame defined in claim 2 wherein said bolted junctions comprise tubular connection members fitted into ends of said arms and having holes registering with holes in said arms, and bolts extending through registering holes of said members and said arms.

6. The support frame defined in claim 1 wherein said aligned arms of said C-shaped frame components are joined together end-to-end in bolted junctions with tubular members of peripherally closed rectangular cross section, and said rectilinear components span said members and are bolted thereto.

7. The support frame defined in claim 6 wherein said bolted junctions comprise flanges closing ends of said arms and said members and bolts traversing said flanges.

8. The support frame defined in claim 6 wherein said bolted junctions comprise plates overlapping flanges ends of said arms and said members, and bolts traversing said flanges.

9. The support frame defined in claim 6 wherein said bolted junctions comprise tubular connectors fitted into ends of said arms and said members having holes registering with holes in said arms and said members, and bolts extending through registering holes of said connectors and of said arms and said members.

10. The support frame defined in claim 1, further comprising additional tubular closed-periphery rectangular cross section struts bridged between each of said rectilinear components and the bar of the respective C-shaped component.

* * * * *